United States Patent
Lo et al.

(10) Patent No.: US 11,991,435 B2
(45) Date of Patent: May 21, 2024

(54) OPTICAL MEMBER DRIVING MECHANISM

(71) Applicant: TDK TAIWAN CORP., Taoyuan (TW)

(72) Inventors: Yu-Chiao Lo, Taoyuan (TW); Chia-Che Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/989,947

(22) Filed: Nov. 18, 2022

(65) Prior Publication Data

US 2023/0164414 A1 May 25, 2023

Related U.S. Application Data (60) Provisional application No. 63/281,198, filed on Nov. 19, 2021.

(51) Int. Cl.
*H04N 23/55* (2023.01)
*G02B 27/64* (2006.01)
*G03B 3/10* (2021.01)
*G03B 13/34* (2021.01)
*G03B 13/36* (2021.01)

(52) U.S. Cl.
CPC ............... *H04N 23/55* (2023.01); *G03B 3/10* (2013.01); *G03B 13/34* (2013.01); *G03B 13/36* (2013.01); *G02B 27/648* (2013.01)

(58) Field of Classification Search
CPC .............................. H04N 23/55; G03B 13/34
See application file for complete search history.

(56) References Cited

U.S. PATENT DOCUMENTS

2018/0284387 A1* 10/2018 Huang .................... G02B 7/08
2022/0283404 A1* 9/2022 Minamisawa ....... G02B 27/646

* cited by examiner

*Primary Examiner* — Minh Q Phan
(74) *Attorney, Agent, or Firm* — MUNCY, GEISSLER, OLDS & LOWE, P.C.

(57) ABSTRACT

An optical member driving mechanism is provided, including a movable portion, a fixed portion, and a first driving assembly. The movable portion is configured to connect an optical member, and is movable relative to the fixed portion. The first driving assembly is configured to drive the movable portion to move relative to the fixed portion in a first dimension.

21 Claims, 6 Drawing Sheets

OPTICAL MEMBER DRIVING MECHANISM

CROSS REFERENCE TO RELATED APPLICATIONS

The present application claims priority to U.S. Provisional Patent Applications No. 63/281,198, filed in Nov. 19, 2021, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. More and more choices are available for users to choose from. However, when a lens with long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical member driving mechanism, including a movable portion, a fixed portion, and a first driving assembly. The movable portion is configured to connect an optical member, and is movable relative to the fixed portion. The first driving assembly is configured to drive the movable portion to move relative to the fixed portion in a first dimension.

In some embodiments, the movement of movable portion relative to the fixed portion in the first dimension is a rotation of the movable portion relative to the fixed portion around a first axis, wherein as seen from the first axis, the optical member driving mechanism has a polygonal structure, and the first driving assembly is disposed on a side of the polygonal structure.

In some embodiments, the optical member driving mechanism further includes a supporting assembly, the movable portion is movably connected to the fixed portion via the supporting assembly, wherein as seen from the first axis, the supporting assembly and the first driving assembly are respectively disposed on the different sides of the polygonal structure. For example, the supporting assembly can include a ball.

In some embodiments, the optical member driving mechanism further includes a second driving assembly configured to drive the movable portion to move relative to the fixed portion in a second dimension, wherein the movement of the movable portion relative to the fixed portion in the second dimension is a rotation of the movable portion relative to the fixed portion around a second axis, and the first axis is substantially perpendicular to the second axis.

In some embodiments, as seen from the first axis, the optical member driving mechanism has a polygonal structure, and the second driving assembly and the first driving assembly are disposed on the same side of the polygonal structure.

In some embodiments, the first driving assembly includes a first coil and a first magnetic member. The first coil is connected to the fixed portion. The first magnetic member is disposed on the movable portion and corresponds to the first coil, wherein as seen from a winding axis of the first coil, the first coil has a longitudinal structure. the second driving assembly includes a second coil and a second magnetic member. The second coil is connected to the fixed portion. The second magnetic member is disposed on the movable portion and corresponds to the second coil, wherein as seen from a winding axis of the second coil, the second coil has a longitudinal structure. Moreover, as seen from the winding axis of the second coil, a longitudinal axis of the first coil is parallel to a longitudinal axis of the second coil.

In some embodiments, the second driving assembly further includes a third coil and a third magnetic member. The third coil is connected to the fixed portion. The third magnetic member is disposed on the movable portion and corresponds to the third coil, wherein the second coil and the third coil are arranged along the first axis. A winding axis of the third coil is parallel to the second axis.

In some embodiments, the first axis and the second axis are perpendicular to a third axis. As seen from the third axis, a center of the first coil is disposed between a center of the second coil and a center of the third coil.

In some embodiments, the optical member driving mechanism further includes a magnetic permeability member, disposed on the movable portion and corresponding to the first magnetic member and the second magnetic member. The magnetic permeability member has a surface facing the first magnetic member and the second magnetic member. An appearance of the magnetic permeability member corresponds to the appearances of the first magnetic member and the second magnetic member, and the magnetic permeability member has an integrated structure.

In some embodiments, the optical member driving mechanism further includes a first sensing assembly, configured to detect the movement of the movable portion relative to the fixed portion, wherein a third axis is perpendicular to the first axis and the second axis. As seen from the third axis, the optical member driving mechanism has a polygonal structure, and the first sensing assembly is disposed on a side of the polygonal structure.

In some embodiments, the optical member driving mechanism further includes a second sensing assembly, configured to detect the movement of the movable portion relative to the fixed portion. As seen from the third axis, the first sensing assembly and the second sensing assembly are disposed on different sides of the polygonal structure.

In some embodiments, as seen from the second axis, the second sensing assembly and the second driving assembly are overlapped. In particular, the second sensing assembly includes a reference member, and the second driving assembly includes a second magnetic member, wherein the reference member and the second magnetic member are disposed on the movable portion, and as seen from the second axis, the reference member and the second magnetic member are overlapped.

In some embodiments, the second sensing assembly includes a reference member and a sensing member, and the second driving assembly includes a second coil and a second magnetic member, wherein the reference member and the sensing member arranged along the first axis, and the second coil and the second magnetic member are arranged along the second axis.

In some embodiments, the optical member driving mechanism further includes a circuit assembly, a first reinforcing member, and a second reinforcing member. The circuit assembly is electrically connected to the second sensing assembly and configured to connect an external circuit. The first reinforcing member and the second reinforcing member are disposed on the circuit assembly and respectively correspond to the first sensing assembly and the second sensing assembly. A thickness of the second reinforcing member is larger than a thickness of the circuit assembly, and a distance that is greater than zero is formed between the first reinforcing member and the second reinforcing member.

In some embodiments, the second driving assembly and the first sensing assembly are disposed on the same side of the polygonal structure.

In some embodiments, the fixed portion includes a frame, and the frame has an outer surface and an opening corresponding to the optical member, wherein a third axis is perpendicular to the first axis and the second axis, and a smallest dimension between the opening and the outer surface in the third axis is larger than smallest dimension between the opening and the outer surface in the first axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
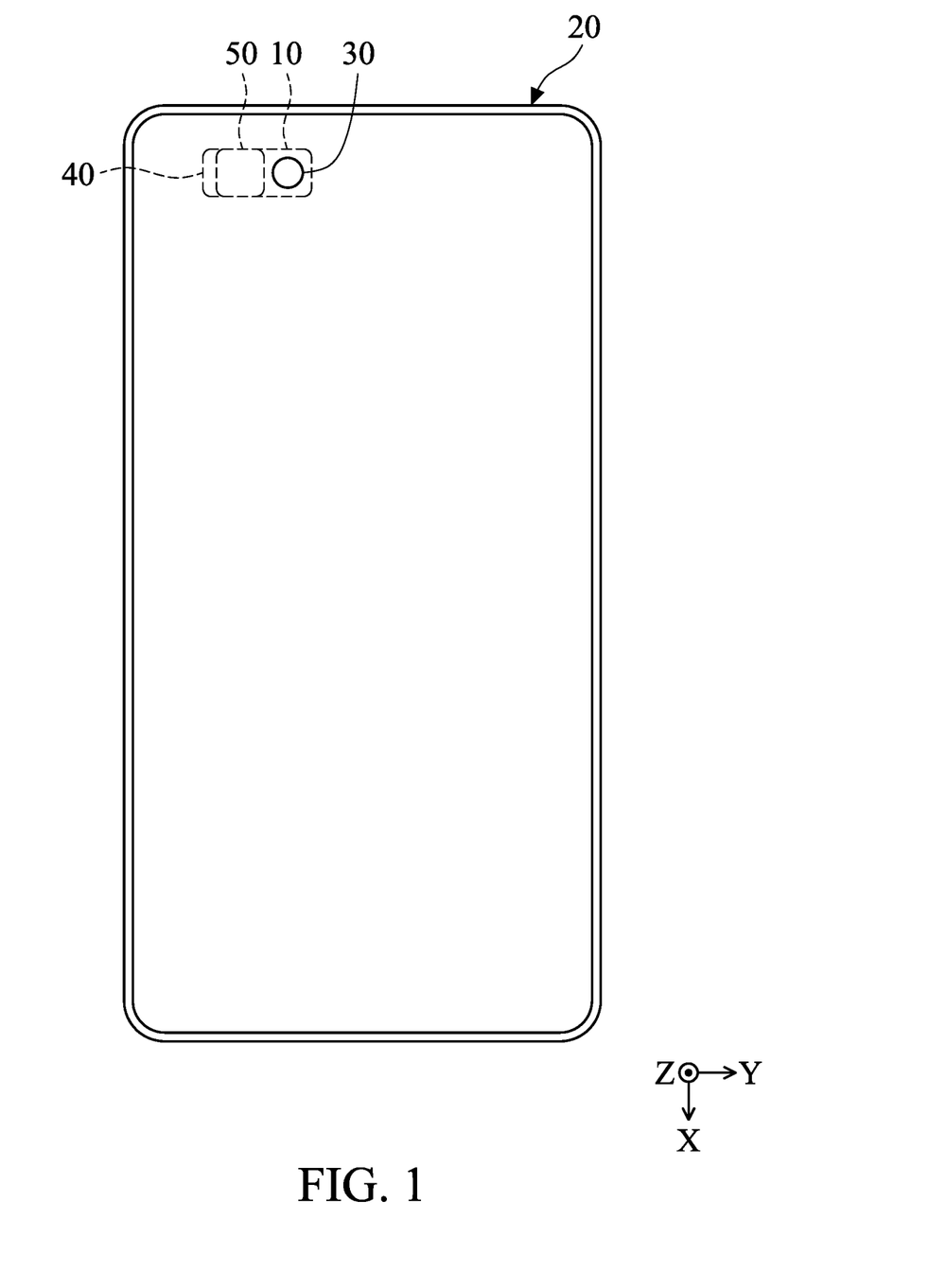
FIG. 1 is a schematic diagram of an electronic device according to an embodiment of the invention.
Figure 2:
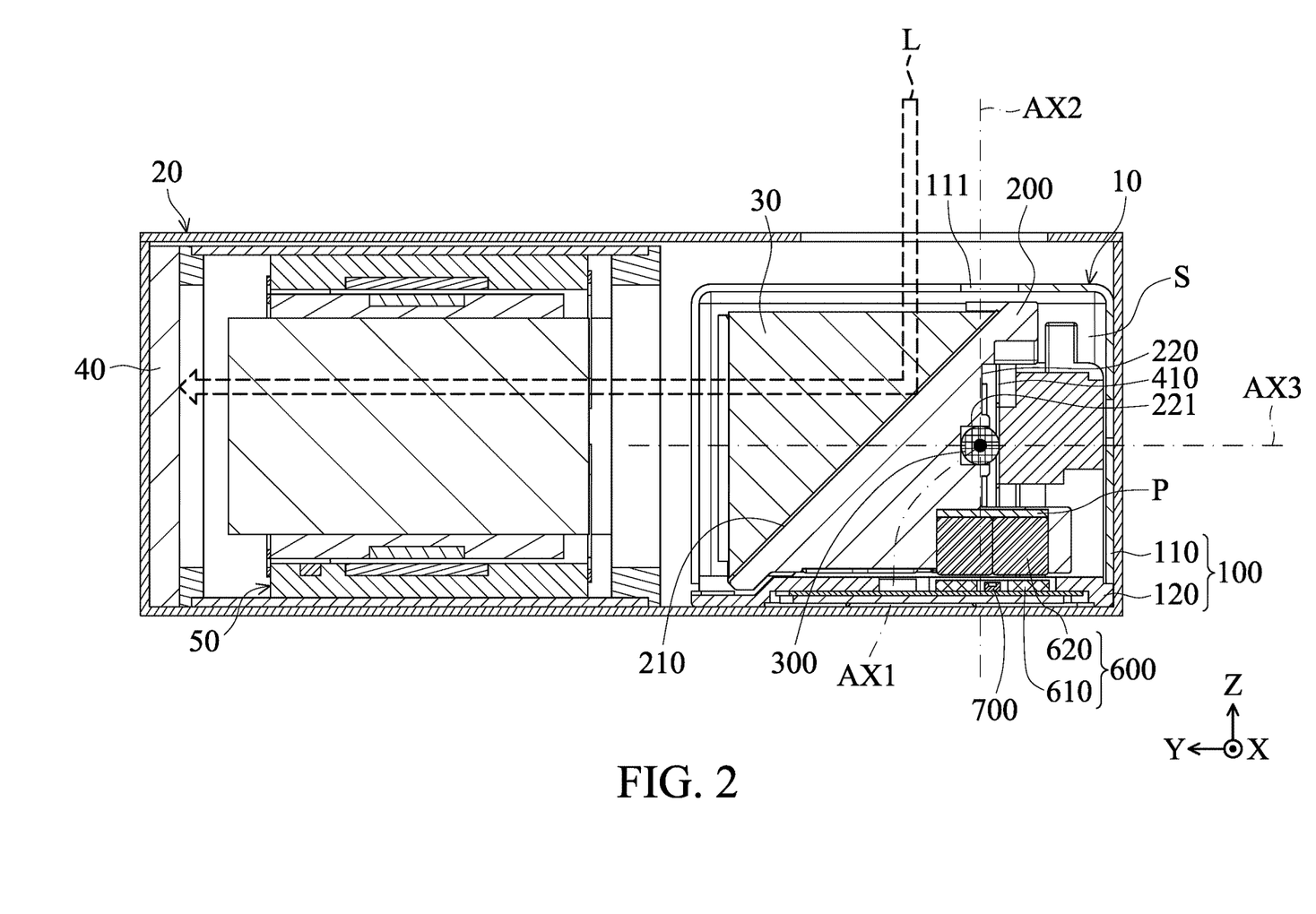
FIG. 2 is a schematic diagram of an optical member driving mechanism, an optical member, an image sensor, and a lens module disposed in the electronic device according to an embodiment of the invention.

Referring to FIGS. 1 and 2, in an embodiment of the invention, an optical member driving mechanism 10 can be disposed in an electronic device 9-20 and hold an optical member 30, and can further drive the optical member 30 to move relative to an image sensor 40 in the electronic device 20 to achieve the purpose of optical image stabilization (OIS). For example, the electronic device 20 can be a digital camera or a smart phone having the function of capturing photographs or making video recordings, and the optical member 30 can be a prism or a mirror. When capturing photographs or making video recordings, an external light L can enter the optical member driving mechanism 10 along a light entering axis (the Z-axis), and move along a light leaving axis (the Y-axis) to reach the image sensor 40 after reflected by the optical member 30. The optical member 30 can be a prism or a mirror, but it is not limited thereto. In this embodiment, a lens module 50 can be disposed between the optical driving mechanism 10 and the image sensor 40 to adjust the focus. In some embodiments, the lens module 50 can be omitted, so that the external light L can directly reach the image sensor 40 after reflected by the optical member 30.

Figure 3:
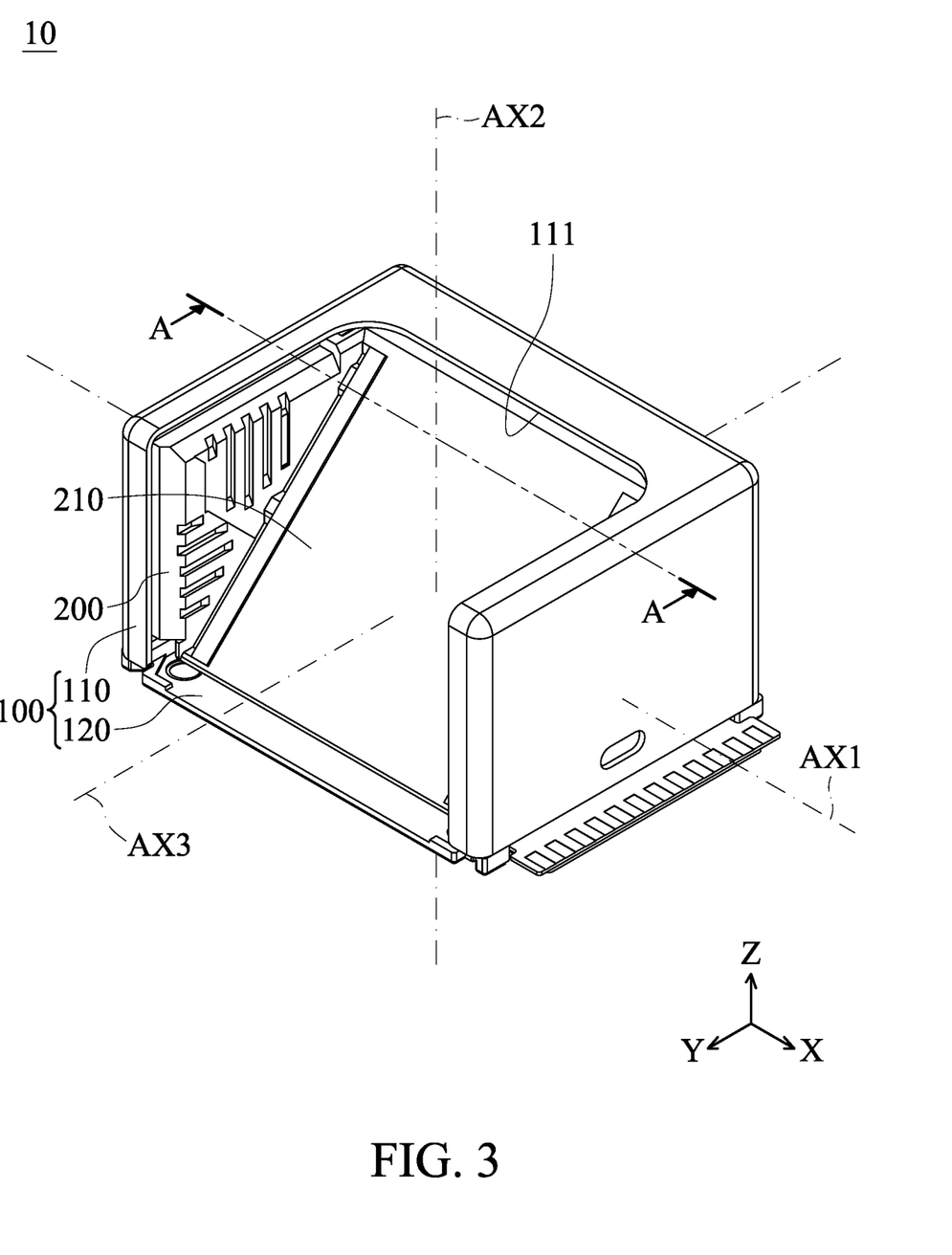
FIG. 3 is a schematic diagram of the optical member driving mechanism according to an embodiment of the invention.
Figure 4:
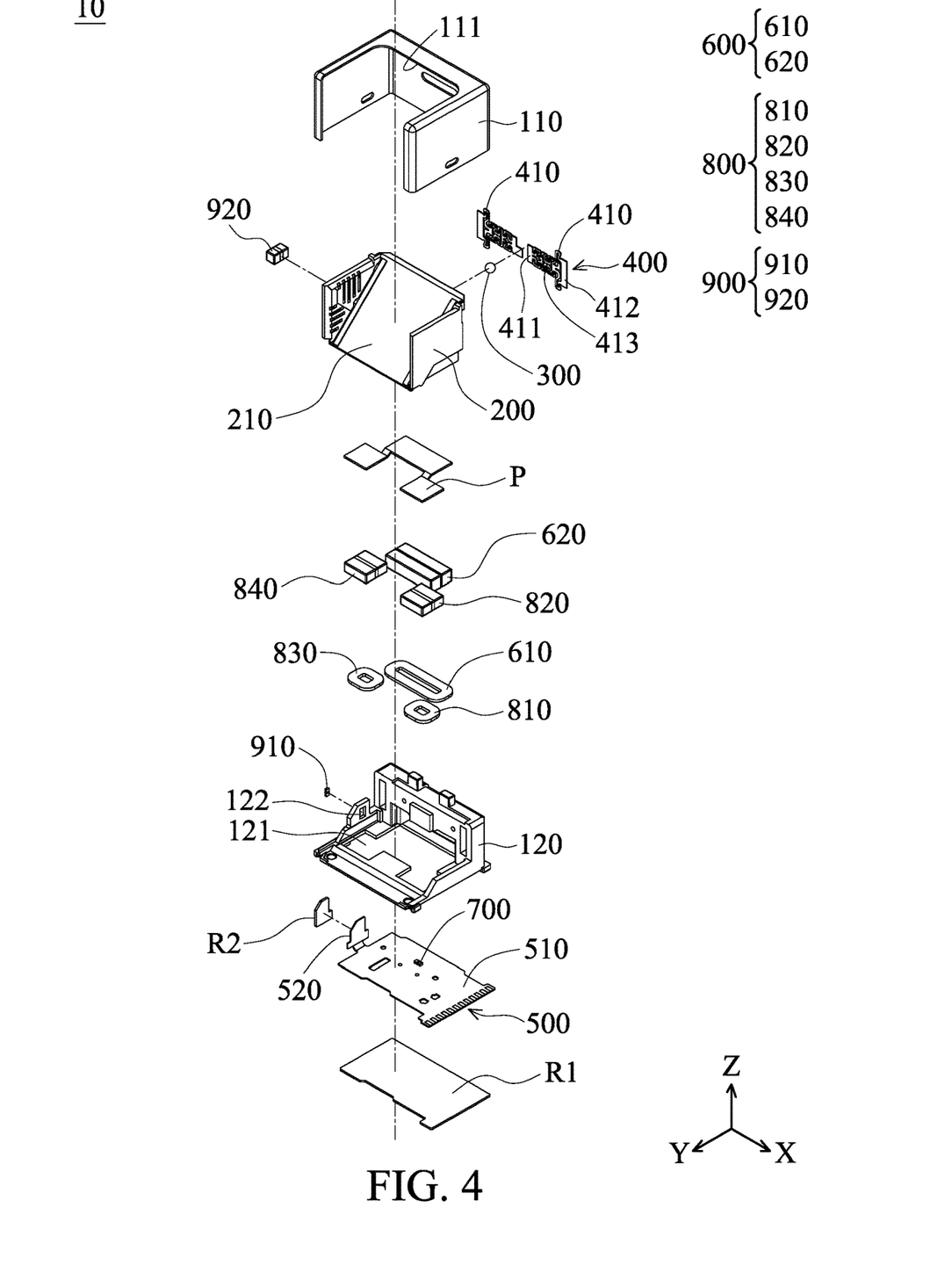
FIG. 4 is an exploded-view diagram of the optical member driving mechanism according to an embodiment of the invention.
Figure 5:
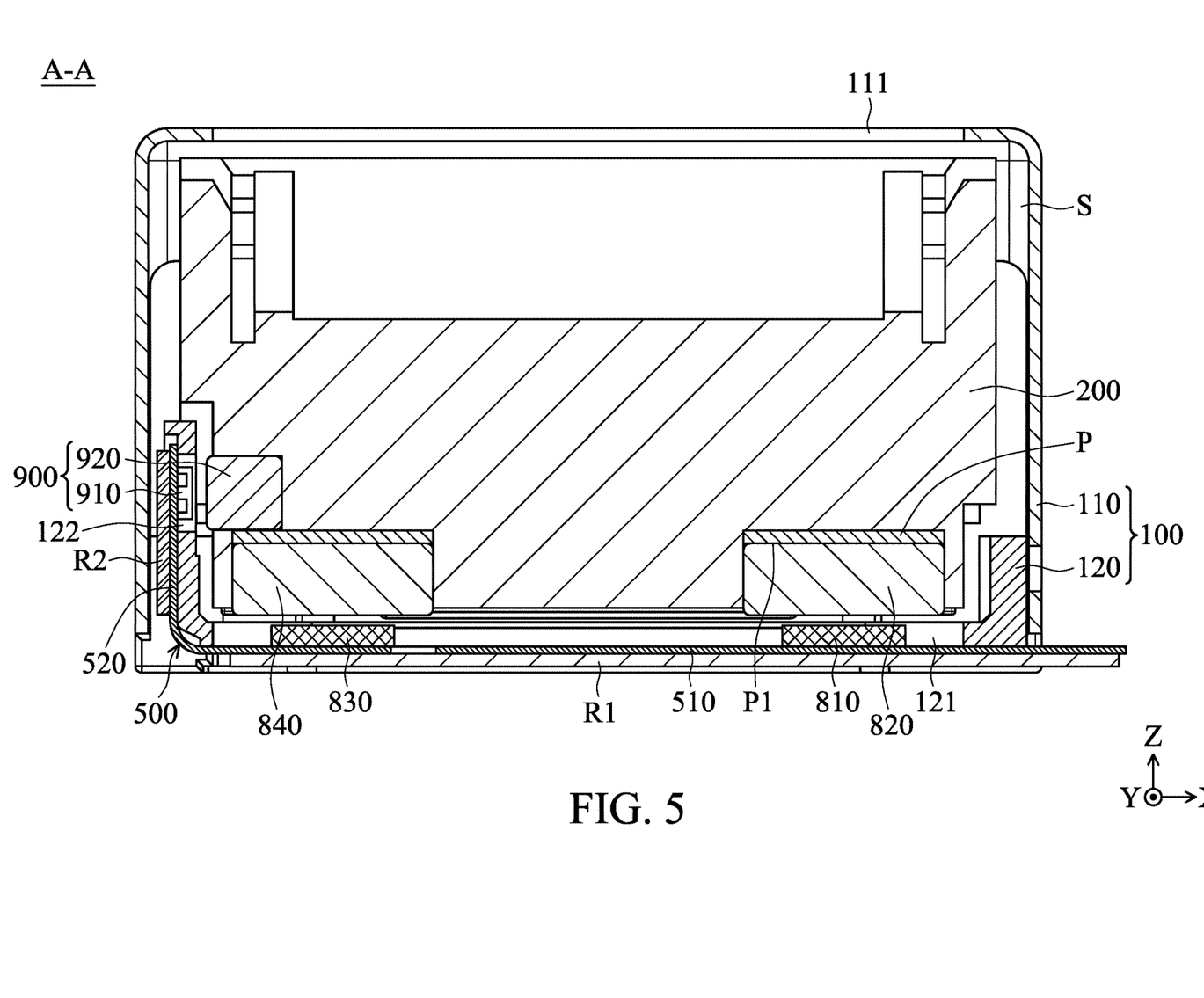
FIG. 5 is a cross-sectional view along the line A-A in FIG. 3.

FIG. 3 is a schematic diagram of the optical member driving mechanism 10, FIG. 4 is an exploded-view diagram of the optical member driving mechanism 10, and FIG. 5 is a cross-sectional view along the line A-A in FIG. 3. As shown in FIG. 2 to FIG. 5, the optical member driving mechanism 10 primarily includes a fixed portion 100, a movable portion 200, a supporting assembly 300, an elastic assembly 400, a circuit assembly 500, a first driving assembly 600, a first sensing assembly 700, a second driving assembly 800, a second sensing assembly 900, a magnetic permeability member P, a first reinforcing member R1, and a second reinforcing member R2.

The fixed portion 100 includes a frame 110 and a base 120. The frame 110 and the base 120 can be engaged together to form an accommodating space S, and the movable portion 200, the supporting assembly 300, and the elastic assembly 400 can be accommodated in the accommodating space S. An opening 111 that is communicated with the accommodating space S is formed on the frame 110, so that the external light L can enter and leave the accommodating space S through the opening 111. A hole 121 and a hole 122 that are communicated with the accommodating space S are formed on the base 120.

The circuit assembly 500 is configured to electrically connect an external circuit in the electronic device 20. The circuit assembly 500 is disposed on the base 120 of the fixed portion 100, and includes a plate part 510 and an extending part 520. The plate part 510 is disposed below the base 120, and the extending part 520 is connected to the plate part 510 and extended to the lateral side of the base 120. In other words, the plate part 510 and the extending part 520 of the circuit assembly 500 are disposed on the different sides of the base 120. In the Z-axis, the base 120 is disposed between the plate part 510 and the frame 110. In the X-axis, the extending part 520 is disposed between the base 120 and the frame 110. In this embodiment, the positions of the plate part 510 and the extending part 520 respectively corresponds to the positions of the hole 121 and the hole 122, so that the plate part 510 and the extending part 520 can be respectively exposed from the hole 121 and the hole 122.

The movable portion 200 can be a holder, and the optical member 30 can be attached to a holding surface 210 of the holder by adhering. A recess 221 is formed on a back surface 220 of the movable portion 200. The supporting assembly 300 is accommodated in the recess 221 and in contact with the movable portion 200 and the base 120 in a movable manner, so that the movable portion 200 is rotatable relative to the fixed portion 100. In this embodiment, the supporting assembly 300 is a ball. The supporting assembly 300 can include metal to prevent the debris from producing during the movement of the movable portion 200 relative to the fixed portion 100, but it is not limited thereto.

The elastic assembly 400 includes at least one metal sheet 410. The metal sheet 410 can be divided into a fixed portion connecting section 411, a movable portion connecting section 412, and a string section 413. The fixed portion connecting section 411 is affixed to the base 120, the movable portion connecting section 412 is affixed to the back surface 220 of the movable portion 200, and the string section 413 is disposed between the fixed portion connecting section 411 and the movable portion connecting section 412 to connect them. Therefore, the movable portion 200 can tightly abut on the base 120 via the elastic force of the elastic assembly 400 to prevent the supporting assembly 300 from falling due to the oversize gap between the fixed portion 100 and the movable portion 200. In this embodiment, the elastic assembly 400 includes two metal sheets 410. The supporting assembly 300 is disposed between two metal sheets 410, and the distance between the fixed portion connecting section 411 and the supporting assembly 300 is less than the distance between the movable portion connecting section 412 and the supporting assembly 300.

The first driving assembly 600 includes a first coil 610 and a first magnetic member 620. The first coil 610 is disposed on the plate part 510 of the circuit assembly 500 and accommodated in the hole 121 of the base 120. The first magnetic member 620 is affixed to a bottom 230 of the movable portion 200, and the position of the first magnetic member 620 corresponds to the position of the first coil 610. When a current flows through the first coil 610, an electromagnetic effect is generated between the first coil 610 and the first magnetic member 620, so that a pushing force can be provided to drive the movable portion 200 to move relative to the fixed portion 100 in a first dimension. In particular, the movable portion 200 moves relative to the fixed portion 100 in the first dimension means that the movable portion 200 rotates around a first axis AX1 relative to the fixed portion 100, and the first axis AX1 is substantially parallel to the X-axis.

The first sensing assembly 700 can be disposed on the plate part 510 of the circuit assembly 500, and can be surrounded by the first coil 610. The first sensing assembly 700 can detect the movement of the first magnetic member 620 to obtain the angle of the movable portion 200 after the movable portion 200 rotates around the first axis AX1. For example, the first sensing assembly 700 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, but it is not limited thereto.

The second driving assembly 800 includes a second coil 810, a second magnetic member 820, a third coil 830, and a third magnetic member 840. The second coil 810 and the third coil 830 are disposed on the plate part 510 of the circuit assembly 500 and accommodated in the hole 121 of the base 120. The second magnetic member 820 and the third magnetic member 840 are affixed to the bottom 230 of the movable portion 200, and the positions of the second magnetic member 820 and the third magnetic member 840 respectively correspond to the positions of the second coil 810 and the third coil 830. When currents flow through the second coil 810 and the third coil 830, an electromagnetic effect is generated between the second coil 810 and the second magnetic member 820, and an electromagnetic effect is generated between the third coil 830 and the third magnetic member 840, therefore, a pushing force can be provided to drive the movable portion 200 to move relative to the fixed portion 100 in a second dimension. In particular, the movable portion 200 moves relative to the fixed portion 100 in the second dimension means that the movable portion 200 rotates around a second axis AX2 relative to the fixed portion 100. The second axis AX2 is substantially perpendicular to the first axis AX1 and substantially parallel to the Z-axis.

In this embodiment, as seen from a winding axis of the first coil 610, the first coil has a longitudinal structure. As seen from a winding axis of the second coil 810, the second coil 810 has a longitudinal structure, and the longitudinal axis of the first coil 610 is parallel to the longitudinal axis of the second coil 810. The extending direction of the longitudinal axis of the first coil 610 and the extending direction of the longitudinal axis of the second coil 810 are the same, and are parallel to the first axis AX1. The winding axis of the first coil 610 and the winding axis of the second coil 810 are substantially parallel to the Z-axis. Moreover, as seen from a third axis AX3 that is perpendicular to the first axis AX1 and the second axis AX2, the center of the first coil 610 is disposed between the center of the second coil 810 and the center of the third coil 830.

Figure 6:
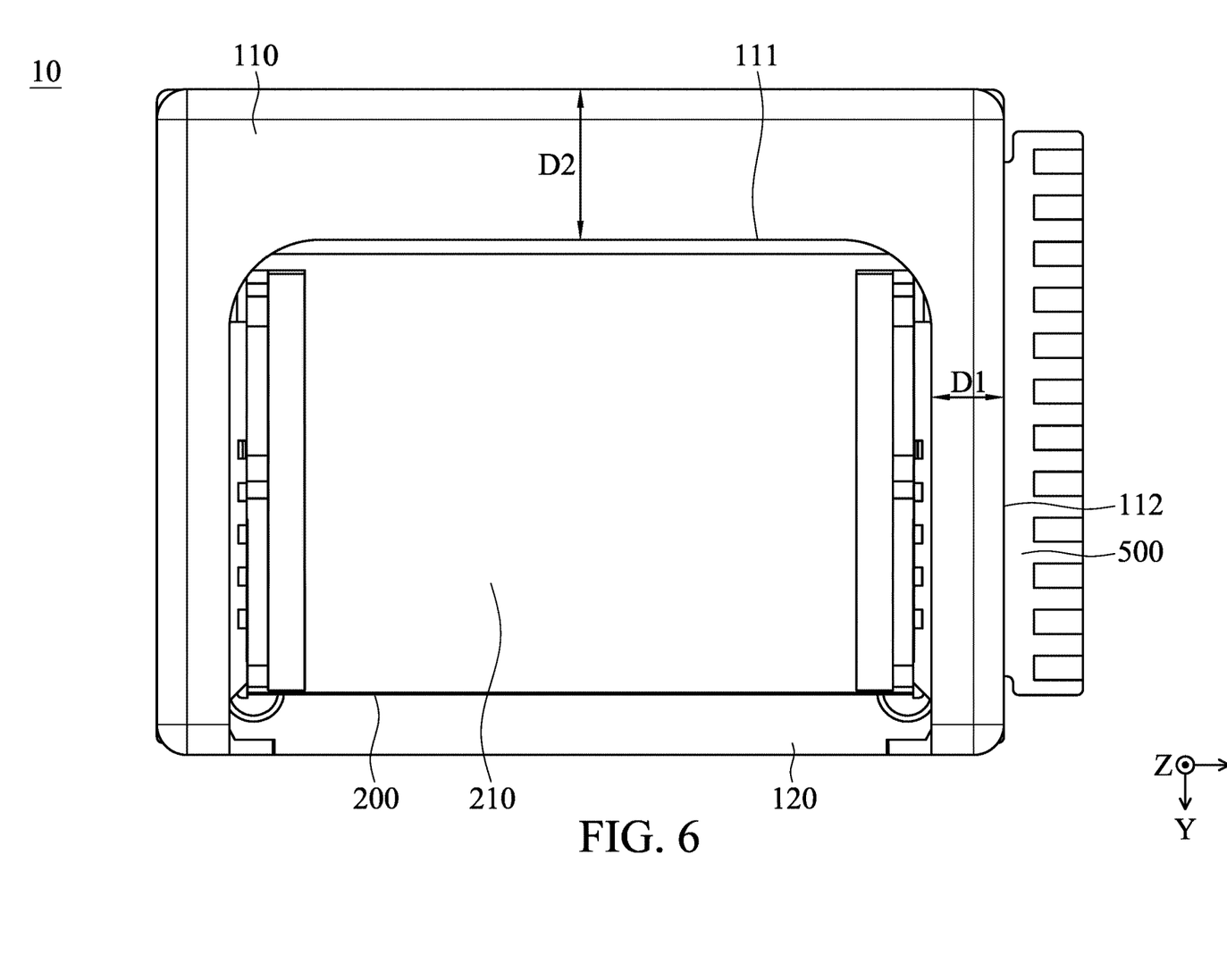
FIG. 6 is a top view diagram of the optical member driving mechanism according to an embodiment of the invention.

As seen from the first axis AX1, the optical member driving mechanism 10 has a polygonal structure. Owing to the aforementioned arrangement, the first driving assembly 600 and the second driving assembly 800 can be disposed on the same side of the polygonal structure (i.e. the bottom side of the optical member driving mechanism 10 in FIG. 2), so that the width of the optical member driving mechanism 10 can be effectively reduced, and the miniaturization of the optical member driving mechanism 10 can be facilitated. As shown in FIG. 6, as seen from the second axis AX2, the smallest dimension D1 between the opening 111 of the frame 110 and the outer surface 112 of the frame 110 in the first axis AX1 is less than the smallest dimension D2 between the opening 111 of the frame 110 and the outer surface 112 of the frame 110 in the third axis AX3.

The second coil 810 and the third coil 830 are arranged along the first axis AX1. As shown in FIG. 2, as seen from the first axis AX1, the supporting assembly 300 and the first and second driving assemblies 600 and 800 are disposed on the different sides of the optical member driving mechanism 10 with the polygonal structure, so that the driving effect of the driving assembly can be increased. Moreover, as seen from the first axis AX1, the first sensing assembly 700 and the second driving assembly 800 are disposed on the same side of the optical member driving mechanism 10 with the polygonal structure.

Referring to FIG. 2 to FIG. 5, the second sensing assembly 900 includes a sensing member 910 and a reference member 920. The sensing member 910 is disposed on the extending part 520 of the circuit assembly 500 and exposed from the hole 121 of the base 120. The reference member 920 is affixed to the movable portion 200, and the position of the reference member 920 corresponds to the position of the sensing member 910. For example, the sensing member 910 can be a Hall sensor, a magnetoresistance effect sensor (MR sensor), a giant magnetoresistance effect sensor (GMR sensor), a tunneling magnetoresistance effect sensor (TMR sensor), an optical encoder, or an infrared sensor, and the reference member 920 can be a magnetic member (such as magnet) or a reflecting member (such as a mirror). When the hall sensor, the magnetoresistance effect sensor, the giant magnetoresistance effect sensor, or the tunneling magnetoresistance effect sensor is used as the sensing member 910, the reference member 920 can be a magnetic member. When the optical encoder or the infrared sensor is used as the sensing member 910, the reference member 920 can be a reflecting member.

The sensing member 910 can detect the movement of the reference member 920 to obtain the angle of the movable portion 200 after the movable portion 200 rotates around the second axis AX2. In this embodiment, as seen from the third axis AX3, the optical member driving mechanism 10 has a polygonal structure, and the first sensing assembly 700 and the second sensing assembly 900 are disposed on the different sides of the polygonal structure. The sensing member 910 and the reference member 920 are arranged along the first axis AX1, the second coil 810 and the second magnetic member 820 are arrange along the second AX2. In the second axis AX2, the reference member 920 and the second magnetic member 820 are overlapped.

The magnetic permeability member P is affixed to the movable portion 200, and disposed between the movable portion 200 and the first, second, and third magnetic m members 620, 820, and 840. The magnetic permeability member P can enhance the driving force of the first driving assembly 600 and the second driving assembly 800. Furthermore, since the first, second, and third magnetic members 620, 820, and 840 can be absorbed to the magnetic permeability member P, the assembly of the optical member driving mechanism 10 can be facilitated. In this embodiment, the magnetic permeability member P has an integrated structure, and its appearance can correspond to the appearances of the first, second, and third magnetic members 620, 820, and 840. In other words, the magnetic permeability member P in this embodiment has a single surface P1 facing the first, second, and third magnetic members 620, 820, and 840.

The first reinforcing member R1 and the second reinforcing member R2 are disposed on the circuit assembly 500, and the positions of the first reinforcing member R1 and the second reinforcing member R2 respectively correspond to the positions of the first sensing assembly 700 and the sensing member 910. The first reinforcing member R1 and the first sensing assembly 700 are respectively disposed on the opposite sides of the plate part 510. In other words, the plate part 510 is disposed between the first reinforcing member R1 and the first sensing assembly 700. Similarly, the second reinforcing member R2 and the sensing member 910 are respectively disposed on the opposite sides of the extending part 520, that is, the extending part 520 is disposed between the second reinforcing member R2 and the sensing member 910. The first reinforcing member R1 and the second reinforcing member R2 include material with sufficient stiffness (such as metal or acrylic), and the thicknesses of the first reinforcing member R1 and the second first reinforcing member R2 is larger than the thickness of the circuit assembly 500. In this embodiment, the first reinforcing member R1 is separated from the second first reinforcing member R2, so that a distance greater than zero is formed therebetween.

In summary, an optical member driving mechanism is provided, including a movable portion, a fixed portion, and a first driving assembly. The movable portion is configured to connect an optical member, and is movable relative to the fixed portion. The first driving assembly is configured to drive the movable portion to move relative to the fixed portion in a first dimension.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to connect an optical member;
   a fixed portion, wherein the movable portion is movable relative to the fixed portion;
   a first driving assembly, configured to drive the movable portion to move relative to the fixed portion in a first dimension, wherein the first driving assembly comprises:
      a first coil, connected to the fixed portion; and
      a first magnetic member, disposed on the movable portion and corresponding to the first coil, wherein as seen from a winding axis of the first coil, the first coil has a longitudinal structure; and
   a second driving assembly, configured to drive the movable portion to move relative to the fixed portion in a second dimension, wherein the second driving assembly comprises:
      a second coil, connected to the fixed portion; and
      a second magnetic member, disposed on the movable portion and corresponding to the second coil, wherein as seen from a winding axis of the second coil, the second coil has a longitudinal structure;
   wherein as seen from the winding axis of the second coil, a longitudinal axis of the first coil is parallel to a longitudinal axis of the second coil;
   wherein the movement of movable portion relative to the fixed portion in the first dimension is a rotation of the movable portion relative to the fixed portion around a first axis, the movement of the movable portion relative to the fixed portion in the second dimension is a rotation of the movable portion relative to the fixed portion around a second axis, and the first axis is substantially perpendicular to the second axis.

2. The optical member driving mechanism as claimed in claim 1, wherein as seen from the first axis, the optical member driving mechanism has a polygonal structure, and the first driving assembly is disposed on a side of the polygonal structure.

3. The optical member driving mechanism as claimed in claim 2, wherein the optical member driving mechanism further comprises a supporting assembly, the movable portion is movably connected to the fixed portion via the supporting assembly, wherein as seen from the first axis, the supporting assembly and the first driving assembly are respectively disposed on different sides of the polygonal structure.

4. The optical member driving mechanism as claimed in claim 3, wherein the supporting assembly comprises a ball.

5. The optical member driving mechanism as claimed in claim 1, wherein as seen from the first axis, the optical member driving mechanism has a polygonal structure, and the second driving assembly and the first driving assembly are disposed on a same side of the polygonal structure.

6. The optical member driving mechanism as claimed in claim 1, wherein the winding axis of the first coil and the winding axis of the second coil are parallel to the second axis.

7. The optical member driving mechanism as claimed in claim 1, wherein an extending direction of the longitudinal axis of the first coil and an extending direction of the longitudinal axis of the second coil are the same and parallel to the first axis.

8. The optical member driving mechanism as claimed in claim 1, wherein the second driving assembly further comprises:
a third coil, connected to the fixed portion; and
a third magnetic member, disposed on the movable portion and corresponding to the third coil, wherein the second coil and the third coil are arranged along the first axis.

9. The optical member driving mechanism as claimed in claim 8, wherein a winding axis of the third coil is parallel to the second axis.

10. The optical member driving mechanism as claimed in claim 8, wherein the first axis and the second axis are perpendicular to a third axis, wherein as seen from the third axis, a center of the first coil is disposed between a center of the second coil and a center of the third coil.

11. The optical member driving mechanism as claimed in claim 1, wherein the optical member driving mechanism further comprises a magnetic permeability member, disposed on the movable portion and corresponding to the first magnetic member and the second magnetic member, wherein the magnetic permeability member has a surface facing the first magnetic member and the second magnetic member.

12. The optical member driving mechanism as claimed in claim 11, wherein an appearance of the magnetic permeability member corresponds to appearances of the first magnetic member and the second magnetic member, and the magnetic permeability member has an integrated structure.

13. The optical member driving mechanism as claimed in claim 1, wherein the optical member driving mechanism further comprises a first sensing assembly, configured to detect the movement of the movable portion relative to the fixed portion, wherein a third axis is perpendicular to the first axis and the second axis, and as seen from the third axis, the optical member driving mechanism has a polygonal structure, and the first sensing assembly is disposed on a side of the polygonal structure.

14. The optical member driving mechanism as claimed in claim 13, wherein the optical member driving mechanism further comprises a second sensing assembly, configured to detect the movement of the movable portion relative to the fixed portion, wherein as seen from the third axis, the first sensing assembly and the second sensing assembly are disposed on different sides of the polygonal structure.

15. The optical member driving mechanism as claimed in claim 14, wherein as seen from the second axis, the second sensing assembly and the second driving assembly are overlapped.

16. The optical member driving mechanism as claimed in claim 14, wherein the second sensing assembly comprises a reference member, wherein the reference member and the second magnetic member are disposed on the movable portion, and as seen from the second axis, the reference member and the second magnetic member are overlapped.

17. The optical member driving mechanism as claimed in claim 14, wherein the second sensing assembly comprises a reference member and a sensing member, wherein the reference member and the sensing member are arranged along the first axis, and the second coil and the second magnetic member are arranged along the second axis.

18. The optical member driving mechanism as claimed in claim 13, wherein the second driving assembly and the first sensing assembly are disposed on a same side of the polygonal structure.

19. The optical member driving mechanism as claimed in claim 1, wherein the fixed portion comprises a frame, and the frame has an outer surface and an opening corresponding to the optical member, wherein a third axis is perpendicular to the first axis and the second axis, and a smallest dimension between the opening and the outer surface in the third axis is larger than a smallest dimension between the opening and the outer surface in the first axis.

20. The optical member driving mechanism as claimed in claim 1, wherein an external light enters the optical member driving mechanism along a light entering axis and leaves the optical member driving mechanism along a light leaving axis, wherein a third axis is perpendicular to the first axis and the second axis, the second axis is parallel to the light entering axis, and the third axis is parallel to the light leaving axis.

21. An optical member driving mechanism, comprising:
a movable portion, configured to connect an optical member;
a fixed portion, wherein the movable portion is movable relative to the fixed portion;
a first driving assembly, configured to drive the movable portion to move relative to the fixed portion in a first dimension;
a second driving assembly configured to drive the movable portion to move relative to the fixed portion in a second dimension, wherein the movement of movable portion relative to the fixed portion in the first dimension is a rotation of the movable portion relative to the fixed portion around a first axis, the movement of the movable portion relative to the fixed portion in the second dimension is a rotation of the movable portion relative to the fixed portion around a second axis, and the first axis is substantially perpendicular to the second axis;

a first sensing assembly, configured to detect the movement of the movable portion relative to the fixed portion, wherein a third axis is perpendicular to the first axis and the second axis, and as seen from the third axis, the optical member driving mechanism has a polygonal structure, and the first sensing assembly is disposed on a side of the polygonal structure; and a second sensing assembly, configured to detect the movement of the movable portion relative to the fixed portion, wherein as seen from the third axis, the first sensing assembly and the second sensing assembly are disposed on different sides of the polygonal structure;

wherein the optical member driving mechanism further comprises a circuit assembly, a first reinforcing member, and a second reinforcing member, the circuit assembly is electrically connected to the second sensing assembly and configured to connect an external circuit, and the first reinforcing member and the second reinforcing member are disposed on the circuit assembly and respectively correspond to the first sensing assembly and the second sensing assembly, wherein a thickness of the second reinforcing member is larger than a thickness of the circuit assembly, and a distance that is greater than zero is formed between the first reinforcing member and the second reinforcing member.

* * * * *